Dec. 31, 1935.　　　A. ALBECK　　　2,026,504
AXLE AND AXLE BEARING
Filed Oct. 12, 1932　　2 Sheets-Sheet 1
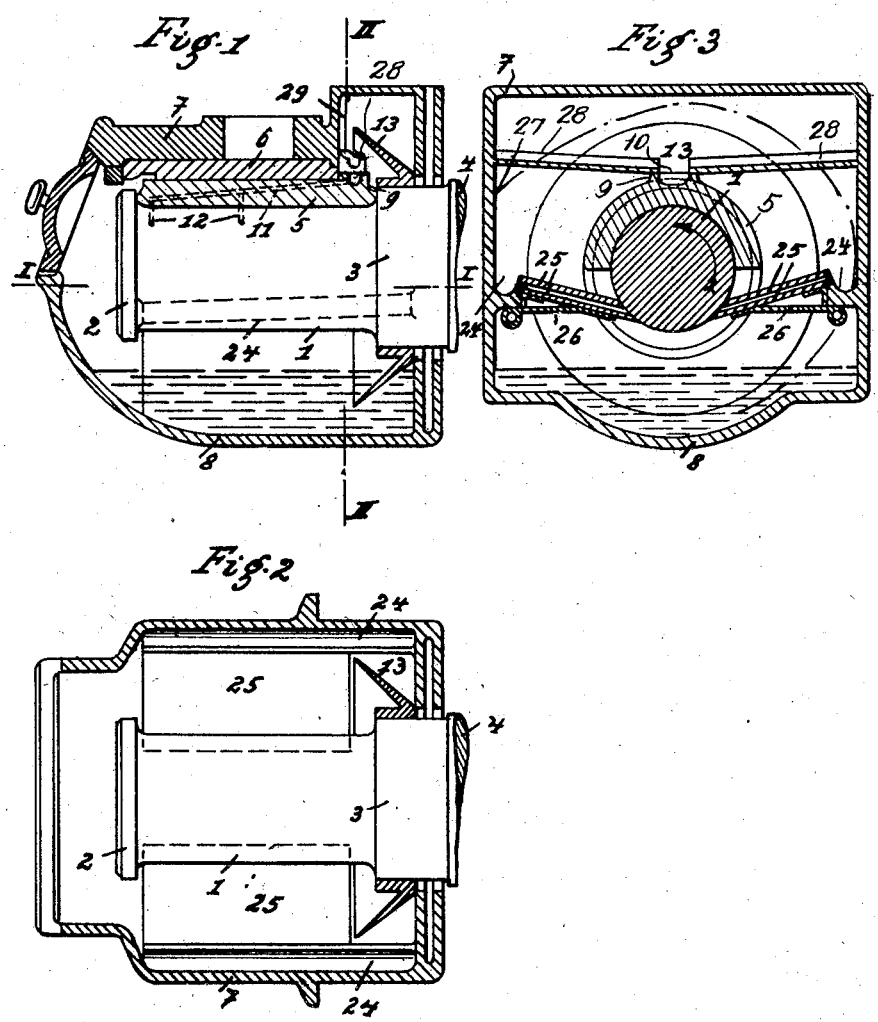
INVENTOR.
ALBERT ALBECK.
ATTORNEY.

Dec. 31, 1935. A. ALBECK 2,026,504
AXLE AND AXLE BEARING
Filed Oct. 12, 1932 2 Sheets-Sheet 2
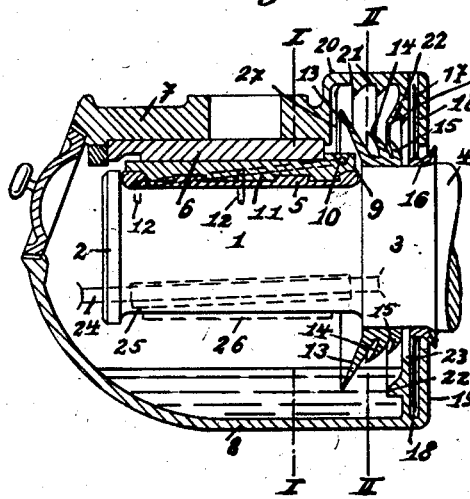
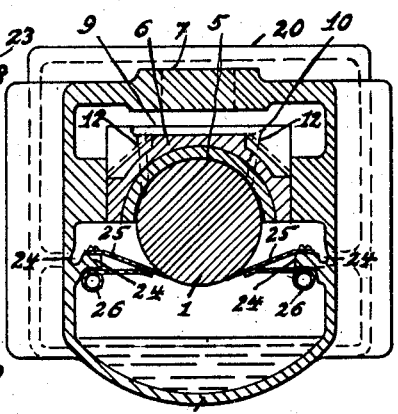
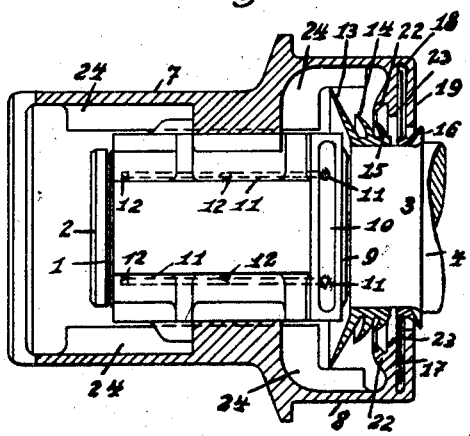
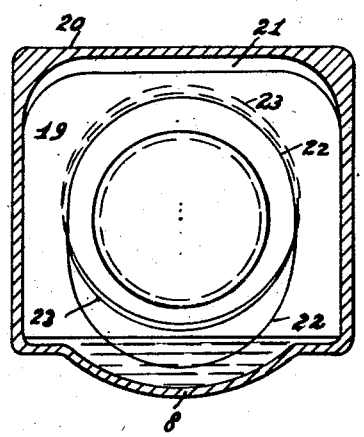
INVENTOR.
ALBERT ALBECK.
ATTORNEY.

Patented Dec. 31, 1935

2,026,504

UNITED STATES PATENT OFFICE 2,026,504

AXLE AND AXLE BEARING

Albert Albeck, Augsburg, Germany, assignor to Hauser & Co., G. m. b. H., Augsburg, Germany Application October 12, 1932, Serial No. 637,537
In Germany May 7, 1932

5 Claims. (Cl. 308—86)

The invention is concerned with lubrication of axles and axle bearings, especially the center and end bearings of railway vehicle axles.

The best results in connection with axle lubrication have generally been obtained with oil flingers or splashers fixed to the axle, dipping into an oil well and throwing oil against the inner surface of an axle box or housing, from which the oil flows to the bearing, but the arrangements heretofore provided for collecting the oil raised by the oil flinger and conducting it to the bearing have not proved satisfactory in some respects, and there has been considerable waste of oil, or lack of full use of the oil provided.

The object of this invention is to provide means whereby substantially more oil than heretofore is taken out of the oil sump by the oil flinger, and all or practically all the oil so taken up is made effective for lubrication, all the used oil, and also all such oil as may at times be thrown ineffectively from the flinger, being returned to the oil well, so that there is no wastage.

According to the invention a flinger, which may be a coned disk or flange, is fixed upon the axle so that it dips into the oil well and flings off the oil picked up in the form of a kind of veil, which has a rotational movement according to the direction of rotation of the axle, and in close proximity to the flinger, near where the same emerges from the oil well, the axle box contains an oil catcher arranged so that the wave of oil raised by the lower part of the flinger curls over on to it and is deflected to the oil conductor and conducted to the axle for lubrication thereof. Generally there is an oil catcher at each side of the axle, so that the same effect is obtained with the axle rotating in either direction. The oil flung upwards without striking the catcher is thrown against a catcher which may be formed by some part of the housing, whence it flows down for lubricating the upper part of the bearing. According to the speed at which the axle is rotating this oil will be flung in a more or less inclined direction, in which case it strikes a surface facing the flinger, or substantially vertically, in which case it strikes a surface at the top of the housing. Provision is made for distributing the oil along the axle in the bearing. The distribution may be assisted by the suction effect of the rotating axle acting on a stream or streams of oil flowing thereto with exclusion of air. The oil may be led to the axle from the side in the form of a single layer, or there may be two or more layers, one above the other.

The abundant supply of evenly distributed oil enables the axle to run smoothly on a film of oil without the usual lubricating pads, so that friction is much reduced.

The formation of the veil of oil is assisted by the use of specially constructed oil carriers, which are flooded by dipping into the oil well and hold oil for a time, that is to say during part of a revolution of the axle, and then passes over to the flinger, for increasing the density or volume of the veil of oil flung off. There is a kind of piling up of oil on one side of the oil carrier, this being assisted by a cavity provided on this side.

The flinger may be a concavo-convex member or coned flange having its rim directed towards the bearing. The particular shape thereof varies according to the general construction of the bearing and box or housing.

Two examples of constructions according to the invention are shown in the accompanying drawings, in Figs. 1 to 3 and in Figs. 4 to 7 respectively.

Fig. 1 is a vertical, longitudinal section, and

Fig. 2 is a horizontal section on the line I—I of Fig. 1,

Fig. 3 being a vertical section on the line II—II of Fig. 1,

Fig. 4 is a vertical longitudinal section, and

Fig. 5 is a horizontal section, part in elevation.

Figs. 6 and 7 are respectively sections on the line I—I and the line II—II of Fig. 4, the axle being omitted for clearness in Fig. 7.

Referring first to Figs. 1 to 3, 1 is the journal of the axle, which has collars 2, 3; 4 represents part of the axle outside the bearing. There is a bearing block 5, and a shell 6, and the axle box 7 is formed at the bottom with an oil well 8. Near the collar 3 the bearing block has a flange 9 with a channel 10, from which ducts 11 extend into the block. Radial ducts 12 lead from the ducts 11 to the surface of the journal 1.

On the collar 3 there is a ring with a coned flange 13 constituting an oil flinger. The lower part of this flange dips into the oil well, and when the axle rotates anti-clockwise, as indicated by an arrow in Fig. 3, the flange flings off the oil which it picks up, in the form of a veil, the outline of which is indicated by a broken line in Fig. 3. The veil itself has rotary motion. At each side of the axle box there is a flange or gallery with a channel 24, downwardly inclined towards the outer end of the box, and the elevated ends of these galleries are in close proximity to the rim of the flange 13, for the purpose of serving as oil catchers. From the inner rim of each of the channels 24 two parallel plates 25, with a slight clearance between them, extend with a downward inclination, towards the journal 1, their inside edges being in contact with the journal, or very close thereto. The gap between the plates, leading from the channel 24 to the journal, is closed at the sides. The plates 25 are supported by springs 26.

Where on one side of the axle the rotating flange 13 emerges from the oil well it sweeps with it a wave or sheet of oil, which strikes the gallery on that side and curls over the rim thereof, so that oil is poured into the channel 24, from which it overflows into the gap between the plates 25 and is conducted to the axle. Oil carried upwards past the gallery is in large part flung against the wall of the box at 27, on the opposite side, and trickles down to the channel 24 on that side, but some oil is also flung against the portion of the box wall facing the upper part of the flange 13. Fixed to this part of the wall are catch channels 28 for conducting the oil to the channel 10, and the wall has vertical ribs 29 for guiding the oil downwards.

In the modification shown in Figs. 4 to 7 there is a journal 1 at the end of the shaft 4, with collars 2, 3, the journal having thereon a bearing block 5 under a shell 6 in an axle box 7, which has an oil well 8, all similar to the corresponding parts shown in Figs. 1 to 3. Likewise the bearing block has a flange 9 with an oil channel 10 from which ducts 11, 12 lead to the journal, for conducting thereto oil which flows from the part 27 of the axle box. There is a ring on the collar 3, with a coned flange 13 dipping into the oil and flinging off a veil of oil, and the ring has two additional, smaller flanges 14 and 15, inclined towards the flange 13. The collar also has thereon a flanged ring 16 within the opening of the axle box, and on this ring 16 there is a felt disk 17 extending into a recess 18 in the wall 19 of the axle box.

At the top, above the flanges 13, 14 and 15 the axle box has a raised portion 20 having on the inside ribs 21 from which oil drips on to the coned flanges 13, 14 and 15, chiefly on to the outside surfaces thereof.

The said flanges 13, 14 and 15 may be at different angles to the journal, and may be made in sections or in one piece. Their outer surfaces may be straight or convex, and may, particularly in the case of the flange 13, be ribbed, roughened, or formed with pockets.

The wall 19 of the axle box has on the inside annular ribs or flanges 22, 23, which catch oil and from which oil drips. The surface and edge of the flange 22 fall off gradually from top to bottom, and the surface and edge of the flange 23 gradually rise from bottom to top. The lower part of the flange 22 is in the oil well 8.

There are channelled flanges or galleries 24 at the sides of the axle box, and elastic bars or plates 25 fixed to these flanges rest on springs 26 and extend downwards towards the journal for conducting oil to the same. The bars or plates 25 may be hinged to the flanges.

It will be understood that the oil which drips from the ribs 21 on to the flanges 13 and 14 is in part flung off again in the upward direction and in part carried back to the oil sump.

Entrance of foreign matter is prevented by the flanged ring 16 and felt disk 17.

What I claim as my invention and desire to secure by Letters Patent of the United States is:—

1. The combination, with an axle, and axle bearing of an axle box having an oil well, an oil flinger on said axle dipping into said well, said oil flinger comprising a plurality of coned annular flanges, an oil catcher in said axle box at approximately the level of the axis of said axle, in the path of oil flung by said flinger, means for conducting oil from said oil catcher to the lower part of said axle, and means above the level of said axle in said axle box for conducting to the upper part of said axle oil which is flung upwards past said flinger.

2. The combination, with an axle, and axle bearing of an axle box having an oil well, an oil flinger on said axle dipping into said well, said oil flinger comprising a plurality of rings on said axle, each having a coned annular flange, an oil catcher in said axle box at approximately the level of the axis of said axle, in the path of oil flung by said flinger, means for conducting oil from said oil catcher to the lower part of said axle, and means above the level of said axle in said axle box for conducting to the upper part of said axle oil which is flung upwards past said flinger.

3. The combination, with an axle, and axle bearing of an axle box having an oil well, an oil flinger on said axle dipping into said well, said oil flinger comprising a plurality of coned annular flanges, of diameters decreasing in the direction away from said axle bearing, an oil catcher in said axle box at approximately the level of the axis of said axle, in the path of oil flung by said flinger, means for conducting oil from said oil catcher to the lower part of said axle, and means above the level of said axle in said axle box for conducting to the upper part of said axle oil which is flung upwards past said flinger.

4. The combination, with an axle, and axle bearing, of an axle box having an oil well, an oil flinger on said axle dipping into said well, said oil flinger comprising a plurality of coned flanges of different degrees of conicity, an oil catcher in said axle box at approximately the level of the axis of said axle, in the path of oil flung by said flinger, means for conducting oil from said oil catcher to the lower part of said axle, and means above the level of said axle in said axle box for conducting to the upper part of said axle oil which is flung upwards past said flinger.

5. The combination, with an axle, and axle bearing, of an axle box having on oil well, an oil flinger on said axle dipping into said well, said oil flinger comprising a plurality of coned annular flanges made in sections, an oil catcher in said axle box at approximately the level of the axis of said axle, in the path of oil flung by said flinger, means for conducting oil from said oil catcher to the lower part of said axle, and means above the level of said axle in said axle box for conducting to the upper part of said axle oil which is flung upwards past said flinger.

ALBERT ALBECK.